United States Patent
Xu et al.

(10) Patent No.: US 9,166,835 B2
(45) Date of Patent: Oct. 20, 2015

(54) SYSTEMS AND METHODS FOR PEAK DETECTION IN AUTOMATIC GAIN CONTROL CIRCUITS IN HIGH-SPEED WIRELINE COMMUNICATIONS

(75) Inventors: ChangXi Xu, Shanghai (CN); XinQing Chen, Shanghai (CN); YanBo Wang, Shanghai (CN)

(73) Assignee: INTEGRATED DEVICE TECHNOLOGY, INC, San Jose, CA (US)

( * ) Notice: Subject to any disclaimer, the term of this patent is extended or adjusted under 35 U.S.C. 154(b) by 290 days.

(21) Appl. No.: 13/416,329

(22) Filed: Mar. 9, 2012

(65) Prior Publication Data

US 2013/0235955 A1    Sep. 12, 2013

(51) Int. Cl.
    *H04L 27/08* (2006.01)
    *H04L 25/03* (2006.01)

(52) U.S. Cl.
    CPC .............................. *H04L 25/03885* (2013.01)

(58) Field of Classification Search
    USPC ................... 375/256, 257, 345, 340, 377; 455/67.11, 115.3, 127.2, 127.3, 214, 455/226.1, 226.2, 232.1, 234.1, 245.1, 455/245.2; 327/58–62
    See application file for complete search history.

(56) References Cited

U.S. PATENT DOCUMENTS

| | | | | |
|---|---|---|---|---|
| 4,707,840 A * | 11/1987 | Nakayama | ...................... | 374/14 |
| 4,839,905 A * | 6/1989 | Mantovani | .................... | 375/230 |
| 5,051,707 A * | 9/1991 | Fujita | ............................ | 330/279 |
| 5,548,833 A * | 8/1996 | Townsend | ................. | 455/234.1 |
| 7,573,335 B2 * | 8/2009 | Blum | ............................ | 330/279 |
| 7,737,731 B1 | 6/2010 | Luo et al. | | |
| 7,864,100 B2 * | 1/2011 | McEwan | ........................ | 342/89 |
| 8,472,573 B2 * | 6/2013 | Solum | ........................ | 375/345 |

OTHER PUBLICATIONS

Q. Le et al., "A Burst-Mode Receiver for 1.25-Gb/s Ethernet PON With AGC and Internally Created Reset Signal", IEEE Journal of Solid-State Circuits, vol. 39, No. 12, pp. 2379-2388, Dec. 2004.
E. A. Crain et al., "A 3.125 Gb/s Limit Amplifier in CMOS With 42 dB Gain and 1 μs. Offset Compensation", IEEE Journal of Solid-State Circuits, vol. 41, No. 2, pp. 443-451, Feb. 2006.
C-F Liao et al., "40 Gb/s Transimpedance-AGC Amplifier and CDR Circuit for Broadband Data Receivers in 90 nm CMOS", IEEE Journal of Solid-State Circuits, vol. 43, No. 3, pp. 642-655, Mar. 2008.

* cited by examiner

*Primary Examiner* — Dac Ha
(74) *Attorney, Agent, or Firm* — Hayes and Boone LLP

(57) ABSTRACT

Methods and systems for peak detection as part of automatic gain control in high-speed communications are provided. A peak detection system uses a portion of an input signal to generate a reference signal for comparison with the input signal. The comparison produces a differential error signal that is in turn used to produce one or more full swing pulses based on the comparison. A pulse counter counts the pulses, and if the count in a single clock cycle is above a determined threshold, a binary error signal is set to indicate a need for correction.

20 Claims, 4 Drawing Sheets

SYSTEMS AND METHODS FOR PEAK DETECTION IN AUTOMATIC GAIN CONTROL CIRCUITS IN HIGH-SPEED WIRELINE COMMUNICATIONS

BACKGROUND

1. Technical Field

The present disclosure relates to the field of signal conditioning in high-speed wireline communications. More specifically, the present disclosure relates to systems and methods for peak detection in automatic gain control circuits such as may be used in adaptive equalization control in high-speed wireline communications.

2. Discussion of Related Art

Whenever electrical signals are transmitted over wires, the integrity of the signals can be degraded. Thus, the signal that was originally placed on the wire will have some differences from the signal that is received at the other end of the wire. This is due to inherent physical properties of the wire.

In a digital signal, the frequency components of a bit can get spread apart as the higher and lower frequency components travel at slightly different rates through the wireline, causing intersymbol interference (ISI). In recent years, as data has been required to travel at faster speeds and over longer wirelines, the problems of maintaining signal integrity and minimizing ISI have increased.

Several techniques have been developed to deal with ISI, including adaptive equalization, which have been found to have some advantages. Adaptive equalizers self-adjust to tailor the response to best counteract the effects of the wireline on a signal. Some adaptive equalizers incorporate peak detection circuits, which monitor and provide the peak signal levels of the incoming signal. However, many peak detection circuits have significant drawbacks. Closed-loop peak detection circuits can consume excessive amounts of power, and open-loop peak detection circuits can also suffer limitations due to finite transconductance in sub-micron CMOS processes. What is needed are improved peak detection methods and circuits.

SUMMARY

Embodiments of a system are provided herein for peak detection in high-speed wireline communications. The system includes a reference generator configured to generate a reference signal, an error amplifier coupled to an output of the reference generator to receive the reference signal, an operational amplifier coupled to the error amplifier, and a pulse counter coupled to an output of the operational amplifier.

Embodiments of a system for signal conditioning in high-speed wireline communications are provided herein. The system includes a system input for receiving an input signal and a variable gain amplifier coupled to the system input. The system also includes a gain control loop for controlling a gain of the variable gain amplifier, the gain being used to modify the input signal. The gain control loop includes a reference generator, an error amplifier coupled to an output of the reference generator, an operational amplifier coupled to the error amplifier, and a pulse counter coupled to an output of the operational amplifier.

Additionally, embodiments of a method for peak detection in high-speed wireline communication systems are provided. The method includes receiving an input signal at a reference generator and an error amplifier, generating a reference signal from a part of the input signal, comparing the input signal and the reference signal to generate an error signal, generating one or more full swing pulse signals from the error signal, counting a number of full swing pulse signals during an operational clock cycle to create a pulse count, and creating a binary error signal based on the number of full swing pulses counted.

These and other embodiments will be described in further detail below with respect to the following figures.

Figure 1:
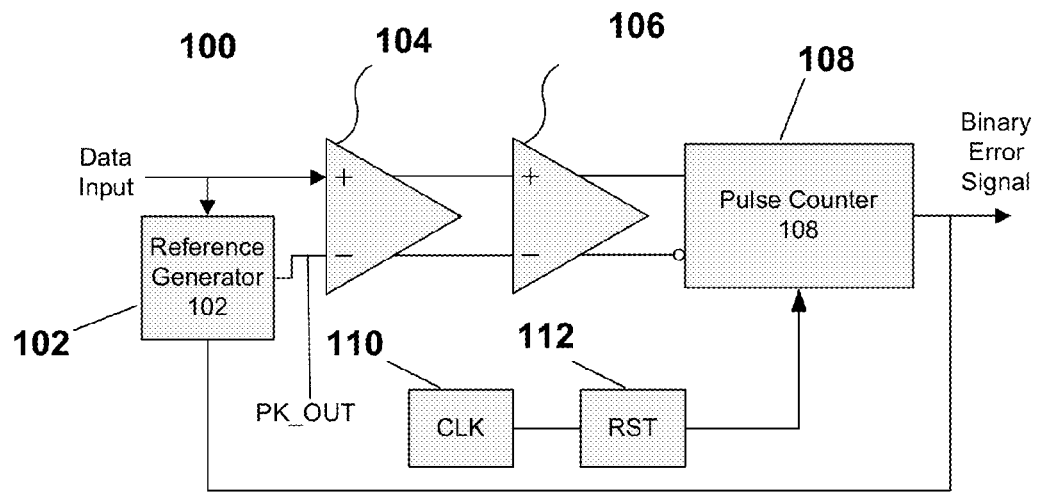
FIG. 1 is a diagram illustrating a detector for facilitating peak detection in high-speed wireline communications systems.

In the drawings, elements having the same designation have the same or similar functions. This is done to clarify and simply the presentation of the various embodiments, and should not be construed to limit the scope of the invention.

The drawings may be better understood by reading the following detailed description.

DETAILED DESCRIPTION

When implementing a peak detector function, one of two methods are usually adopted: a closed loop architecture and an open loop architecture. A closed loop architecture is illustrated, for example, in FIG. 5 of U.S. Pat. No. 7,737,731 and in FIGS. 5(a) and (b) of "A Burst-Mode Receiver for 1.25 Gb/s Ethernet PON with AGC and Internally Created Reset Signal," Quan Le, Sang-Gug Lee, Yong-Hun Oh, Ho-Yong Kang, and Tae-Hwan Yoo, IEEE Journal of Solid State Circuits, Vol. 29, No. 12, December 2004. A high gain bandwidth product amplifier or amplifier chain is then required to achieve a high speed data rate. Typically, a large amount of power consumption is needed to obtain the desired gain and bandwidth for speed and accuracy with CMOS current mode logic (CML) implementation.

An open loop architecture usually uses an envelope detector or a power rectifier to detect the signal RMS value within some time constant as an indicator of its peak value. This architecture is illustrated, for example, in FIGS. 4 and 5 of "A 3.125 Gb/s Limit Amplifier in CMOS with 42 dB Gain and 1 µS Offset Compensation," Ethan A. Crain and Michael H. Perrott, IEEE Journal of Solid State Circuits, Vol. 41, No. 2, February, 2006 and in FIG. 15 from "40 Gb/s Transimpedance-AGC Amplifier and CDR Circuit for Broadband Data Receivers in 90 nm CMS," Chih-Fan Liao and Shen-Iuan Liu, IEEE Journal of Solid-State Circuits, Vol. 43, No. 3, March 2008. For deep sub-micro CMOS processes where MOS transistor devices are operating under low power, the relative low efficiency of a power rectifier due to the finite transconductance and voltage headroom will degrade the performance of signal peak detection. Moreover, the properties of random data streams will suffer significant high frequency energy loss due to the channel characteristics. This will cause an inaccuracy problem when comparing these averaged power levels with that of a DC reference level.

Embodiments of the present invention provide an open-loop peak detector architecture combined with statistical characterization of the random incoming data stream to detect peak values in a simple straight-forward manner. FIG. 1 shows a diagram illustrating a detector 100 for facilitating peak detection in high-speed wireline communications system. Detector 100 may have a data input at which it receives an input signal. The input signal may be routed to a reference generator 102 and an error amplifier 104. Reference generator 102 may generate a reference level or reference signal, which may be a DC level voltage. This reference level may be based on the input signal, for example the common mode voltage of the data input signal. In other embodiments, a separate reference voltage may be supplied to reference generator 102, instead of the input signal, from which the reference level is produced.

In addition to receiving the input signal, error amplifier 104 may receive the reference level from reference generator 102. Error amplifier 104 may be a wideband, fully differential amplifier. Error amplifier 104 may compare the input signal and the reference level to determine a differential error signal between the signals. This differential error signal may be a preliminary error signal. The comparison may include comparing the eye height of the input signal with that of the reference level generated by reference generator 102. The eye height indicates a signal's peak swing. Both outputs of error amplifier 104 may be received as inputs to an operational amplifier 106.

Like error amplifier 104, operational amplifier 106 may be a wideband, fully differential amplifier. Operational amplifier 106 may convert the differential error signal into a full swing pulse. For example, operational amplifier 106 may generate a full swing pulse if the eye height or peak swing of the input signal is less than the reference level. Alternatively, operational amplifier 106 may generate a full swing pulse if the eye height or peak swing of the input signal exceeds the reference level. Therefore, a differential pulse is produced by amplifier 106 each time the signal level at data input exceeds the signal provided by reference generator 102.

Detector 100 may include a clock 110. The input signal may be such that operational amplifier 106 generates one or more full swing pulses during a single clock cycle. Pulse counter 108 may receive the differential input from operational amplifier 106 and provide a signal PK_Attack whenever the number of pulses received within a clock cycle exceeds a set number of pulses. Pulse counter 108 may be a digital pulse counter configured to count the number of pulses received at its input. When the count of the number of pulses reaches or exceeds a threshold the pulse counter sets an output high. The output may be a binary error signal, either a logic low or a logic high indicating whether or not the output signal from reference generator 102 is above the peak values of the data input signal.

As shown in FIG. 1, a reset 112 may be included. Reset 112 provides a reset signal RST to pulse counter 108 in response to the clock signal from clock 110. In some embodiments, at the end of each clock cycle, a reset signal may be generated. Upon receipt of the reset signal RST, pulse counter 108 may reset by setting the count of the number of pulses during that clock cycle to zero. Additionally, the binary error signal PK_Attack may be reset. But before it is reset it may be synchronized with a flexible digital signal processing system. The flexible digital signal processing system may use the value to determine and generate feedback control signals to adjust for the detected peaks of the input signal.

Figure 2:
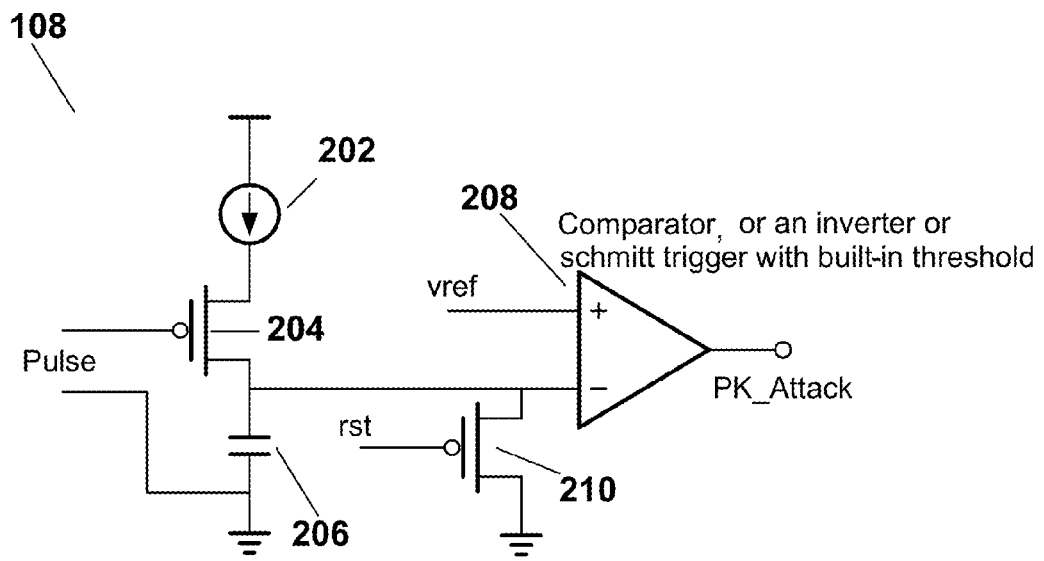
FIG. 2 illustrates a pulse counter that can be utilized in the detector illustrated in FIG. 1.

FIG. 2 illustrates an embodiment of pulse counter 108 that can be utilized in the detector 100. In the embodiment shown in FIG. 2, pulse counter 108 includes an analog current to voltage converter (capacitor 206) and a comparator circuit (amplifier 208). The differential pulse signal from amplifier 108 is received such that one side is coupled to ground and the other to the gate of a transistor 204. Transistor 204 couples current source 202 with a capacitor 206 such that whenever the pulse signal is high, transistor 204 turns on and capacitor 206 is charged. A signal from capacitor 206 is input to amplifier 208 and compared with a reference signal vref. Once the charge on capacitor 206 is sufficient to provide a voltage to amplifier 208 that exceeds vref, then the signal PK_Attack becomes high.

Figure 3:
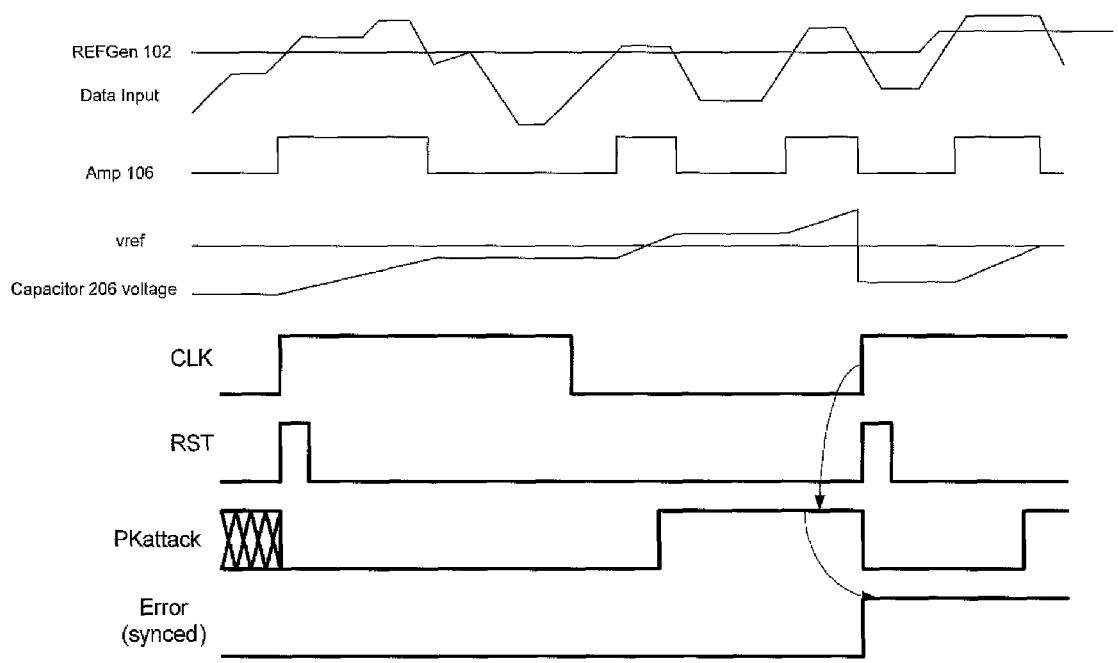
FIG. 3 is a timing diagram of the device illustrated in FIGS. 1 and 2.

FIG. 3 illustrates a timing diagram for detector 100 illustrated in FIGS. 1 and 2. As shown in FIG. 3, amplifier 106 provides a high differential signal during the time when the data input signal exceeds the output signal from reference generator 102. As illustrated in FIG. 2 and illustrated further in FIG. 3, when a high pulse signal from amplifier 106 is received, transistor 204 turns on and the voltage on capacitor 206 increases. Once the voltage on capacitor 206 exceeds vref, the signal PK_attack goes high. Capacitor 206 is discharged and PK-Attack goes to low when the reset signal RST turns on transistor 210. In some embodiments, the signal PK_Attack can be latched with clock signal CLK so that an error signal Error can be synced with the clock signal. Error signal is high for one clock period if PK_Attack is high when the clock signal CLK transitions from low to high.

As mentioned, one or more pulses may be counted during a clock cycle, and if the number of pulses, or the duration of the pulses, exceeds or meets a threshold then the binary error signal is set. In some embodiments, the threshold may be determined by a signal coding scheme or standard. The scheme or standard may specify a training sequence for training sequence equalization (TSEQ). Thus, in embodiments conforming to the USB 3.0 specification, the TSEQ will require at least a count of 10 consecutive identical digits (CID). Some embodiments may use analog implementations of pulse counter 108. For example, pulse counter 108 may be implemented by a voltage-to-current converter and a current summation operation on a low-pass like circuit. Alternatively, an analog value may be compared with an analog threshold to generate a digitized error control signal. This may be accomplished with a comparator, an inverter, or a Schmitt trigger with a built-in threshold.

Figure 4:
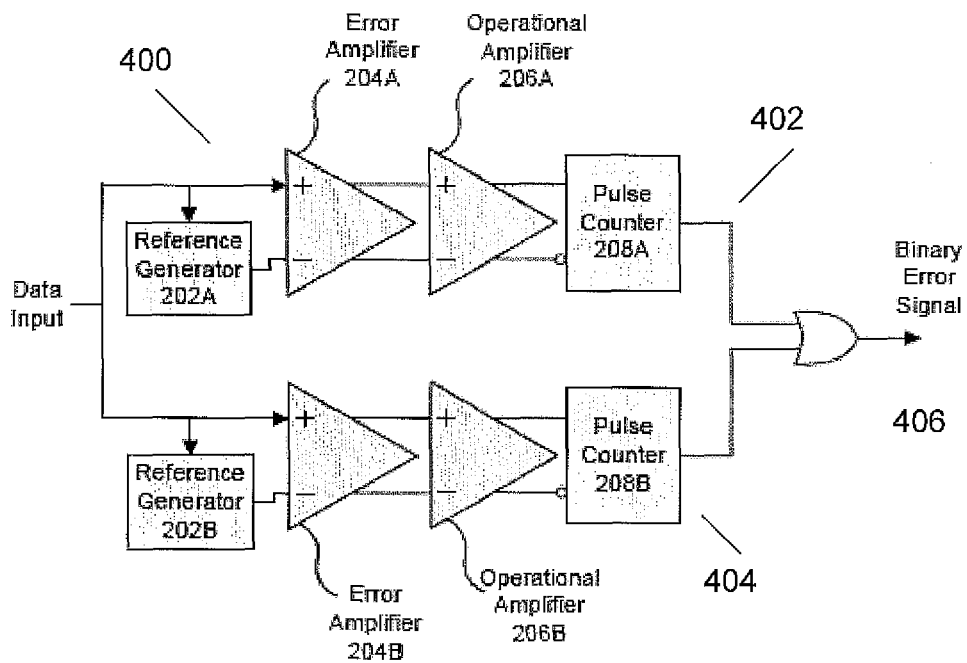
FIG. 4 is a diagram illustrating a detector configured to detect rising and falling pulse edges for facilitating peak detection in high-speed wireline communications.

FIG. 4 is a diagram illustrating a system 400 for detecting on both the rising and falling pulse edges to facilitate peak detection in high-speed wireline communications system. System 400 includes two peak detection branches, each branch similar to system 100. Thus, system 400 may include a negative branch 402 with a reference generator 202A, an error amplifier 204A, an operational amplifier 206A and a pulse counter 208A. In a positive branch 404, system 400 may include a reference generator 202B, an error amplifier 204B, an operational amplifier 206B, and a pulse counter 208B. As shown in FIG. 4, system 400 may be configured to receive a single input signal and output a single binary error signal. The outputs of pulse counter 208A and pulse counter 208B may be connected using a logic OR gate 406 so that either branch can independently set a final binary error signal.

In some embodiments, the positive branch 402 may be configured to detect the rising edges of the pulse signals generated by operational amplifier 204A, while the negative branch 404 may be configured to detect the falling edges of the pulse signals generated by operational amplifier 204B. In other embodiments, the A branch may detect the falling edges, while the B branch detects the rising edges. Thus system 400 may be configured to set the binary error signal if the pulse counter in either branch counts a number of rises or falls within the clock cycle exceeding or meeting the threshold.

Figure 5:
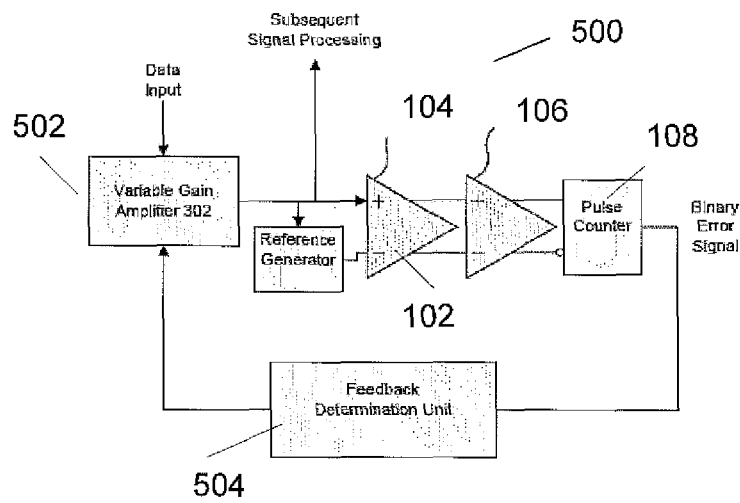
FIG. 5 is a diagram illustrating a detector for facilitating an automatic gain control loop in high-speed wireline communications by using a peak detection system.

FIG. 5 is a diagram illustrating a device 500 for facilitating control of an automatic gain loop in high-speed wireline communications system by using peak detection. Device 500 may include all the features of device 100. Thus, device 500 may include a reference generator 102, an error amplifier 104, an operational amplifier 106, and a pulse counter 108. Additionally, device 500 may also include a variable gain amplifier 502 and a feedback determination unit 504. The features depicted in device 500 forms an automatic gain control loop, where the signal from variable gain amplifier 502 is adjusted in eye height to match signals from reference generator 102.

In operation, device 500 may receive an input signal at variable gain amplifier 502. In an initial state, variable gain amplifier 502 may have a default gain setting which will be applied to the input signal. The gain-adjusted input signal may then be transmitted along three paths: a first path to subsequent signal processing which may apply other signal correction algorithms, a second path to error amplifier 104, and a third path to reference generator 102. Reference generator 102 may use a portion of the gain-adjusted input signal to generate a reference level. The portion of the gain-adjusted input signal may be a common mode voltage present in the signal.

Error amplifier 104 may compare the gain-adjusted input signal with the reference signal, and thereby may form a differential error signal. Operational amplifier 106 may receive the differential error signal and, based on it, generate one or more full pulse swings. Pulse counter 108 may receive the one or more pulse swings and count them. If the number of pulse swings counted exceeds or meets a pre-determined threshold number, the pulse counter may cause its output, binary error signal to be asserted high. If the number of pulse swings does not meet or exceed the threshold, the binary error signal may be a logic low.

The binary error signal may be transmitted to a digital signal processing block, feedback determination unit (FDU) 504. The FDU 504 may create a gain control, based on the value of the binary error signal, to transmit to variable gain amplifier 302. The gain control signal may cause variable gain amplifier 302 to adjust by increasing or decreasing the gain applied to the input signal. Thus, completing the automatic gain control loop.

Figure 6:
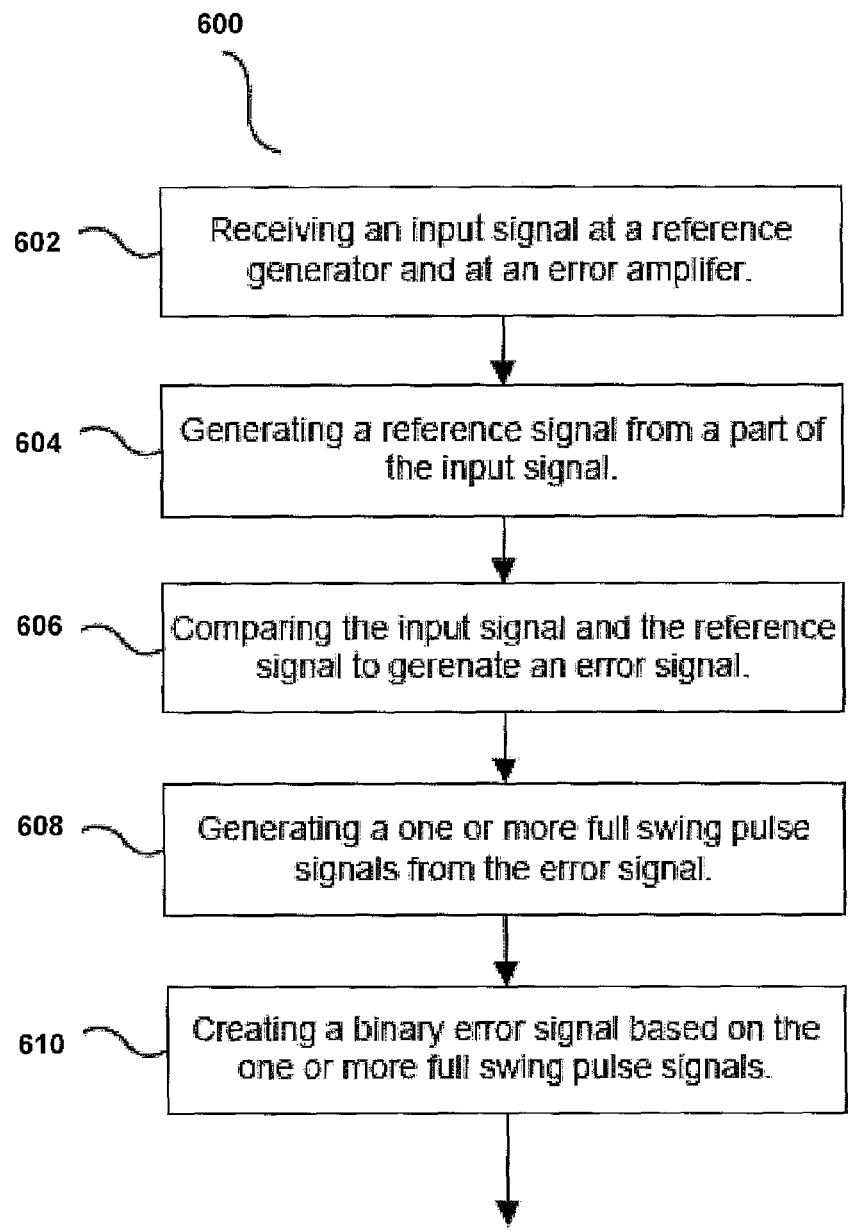
FIG. 6 is a flowchart illustrating a method for detecting peaks in a signal in high-speed wireline communications.

FIG. 6 illustrate a flowchart illustrating a method 600 for conditioning high-speed wireline signals by using peak detection in automatic gain control. Method 600 may be implemented using a peak detection system such as devices 100, 400, or 500 as described above. Those systems will be used herein to provide details regarding the operation of method 600. However, method 600 should not be understood as limited to implementation in those particular systems.

Method 600 may begin in step 602 when a peak detection system receives an input signal at a reference generator and at an error amplifier. The system may generate a reference signal from a part of the input signal, in step 604. In step 606, the system may compare the input signal and the generated reference signal to generate a differential error signal. Based on the differential error signal, the peak detection system may generate one or more full swing pulses in step 608. Then, in step 610, the one or more full swing pulses may be used to create a binary error signal. The binary error signal may indicate whether the input signal's eye height, i.e., the signal swing, exceeded the reference level.

Using system 100 as a non-limiting example, method 600 may begin when an input signal is received by a reference generator 102 and an error amplifier 104 (Step 602). Reference generator 102 may use a portion of the input signal, such as the common mode voltage of the input signal, to generate a reference level (Step 604). Error amplifier 104 may compare the reference level and the input signal and generate a differential error signal as a result of the comparison (Step 606). Specifically, error amplifier 104 may determine which of the input signal (or the eye height of the input signal) and reference level is higher.

The differential error signal may then be transmitted to an operational amplifier 106. Operational amplifier 106 may be configured to generate one or more full swing pulses based on the error signal (Step 608). Then, the system may create a binary error signal based on the one or more full swing pulses generated by operational amplifier 106 (Step 610). If operational amplifier 106 produces more than a threshold number of full swing pulses, then a pulse counter 108 may set the binary error signal to a logic high. Correspondingly, if operational amplifier 106 produces fewer than the threshold number of full swing pulses, then pulse counter 108 may set the binary error signal to a logic low. In some embodiments the opposite scheme may be used.

In some embodiments, additional steps may be performed by the peak detection system in conjunction with method 600. For example, in order to determine if the operational amplifier 106 produces more or fewer full swing pulses than the threshold, pulse counter 108 may be configured to count the one or more full swing pulses during an operational clock cycle. This count may be compared with the threshold to create the binary error signal. Additionally, some embodiments may continue by synchronizing the binary error signal with a digital signal processing subsystem configured to generate feedback signals based on the effective binary error signal. This synchronization may preserve the value of the binary error signal for a time even though the clock signal may reset the binary error signal and the count of pulses.

In the detailed description above, specific details have been set forth describing certain embodiments. It will be apparent, however, to one skilled in the art that the disclosed embodiments may be practiced without some or all of these specific details. The specific embodiments presented are meant to be illustrative but not limiting. One skilled in the art may recognize other material that, although not specifically described herein, is still within the scope and spirit of this disclosure.

What is claimed is:

1. A system for peak detection in high-speed wireline communications, the system comprising:
   a reference generator configured to generate a reference signal;
   an error amplifier coupled to an output of the reference generator to receive the reference signal, the error amplifier also receiving an input signal;
   an operational amplifier coupled to the error amplifier, the operational amplifier configured to generate one or more pulses based on a comparison of the reference signal and the input signal; and
   a pulse counter coupled to an output of the operational amplifier, the pulse counter counting the one or more pulses received in an operational clock cycle of the pulse counter.

2. The system of claim 1, wherein the error amplifier and the operational amplifier are wideband differential amplifiers.

3. The system of claim 1, wherein the pulse counter comprises one of a digital pulse counter, an analog implemented current-to-voltage converter, and a comparator circuit with an analog threshold voltage.

4. The system of claim 3, wherein:
the error amplifier is configured to compare the reference signal and the input signal;
the operational amplifier is configured to produce one or more pulses based on the comparison of the reference and input signals; and
the pulse counter is configured to count the one or more pulses.

5. The system of claim 4, wherein the pulse counter is further configured to form and transmit a binary error signal based on the count of the one or more pulses received in the operational clock cycle.

6. A system for signal conditioning in high-speed wireline communications, the system comprising:
a system input for receiving an input signal;
a variable gain amplifier coupled to the system input;
a gain control loop for controlling a gain of the variable gain amplifier, the gain being used to modify an input signal, and the gain control loop comprising:
a reference generator that generates a reference signal;
an error amplifier coupled to an output of the reference generator;
an operational amplifier coupled to the error amplifier, the operational amplifier configured to generate one or more pulses based on a comparison of the reference signal and the input signal; and
a pulse counter coupled to an output of the operational amplifier, the pulse counter counting the one or more pulses received in an operational clock cycle of the pulse counter.

7. The system of claim 6, wherein the pulse counter comprises one of a digital pulse counter, an analog implemented current-to-voltage converter, and a comparator circuit with an analog threshold voltage.

8. The system of claim 6, wherein the error amplifier and the operational amplifier are fully differential.

9. The system of claim 6, wherein the reference generator is configured to use a portion of the input signal to generate the reference signal for comparison with the input signal.

10. The system of claim 6, wherein the error amplifier compares the input signal and the reference signal to generate an differential error signal.

11. The system of claim 10, wherein the operational amplifier produces at least one pulse based on the differential error signal.

12. The system of claim 11, wherein the pulse counter is configured to generate a first binary error signal upon the detection of a count of pulses above a determined threshold, the count of pulses being a count of one of:
the number of rising edges of the pulses; and
the number of falling edges of the pulses.

13. The system of claim 12, further comprising an operational clock, the operational clock resetting the count of pulses at the end of the operational clock cycle.

14. The system of claim 6, wherein the gain control loop further comprises:
a second reference generator;
a second error amplifier coupled to an output of the second reference generator;
a second operational amplifier coupled to the error amplifier; and
a second pulse counter coupled to an output of the operational amplifier.

15. The system of claim 14, wherein the reference generator, the error amplifier, the operational amplifier, and the pulse counter are configured to create a first binary error signal; and
the second reference generator, the second error amplifier, the second operational amplifier, and the second pulse counter are configured to create a second binary error signal, the second binary signal determined by:
the number of rising edges of the pulses if the first binary error signal is determined by the number of falling edges of the pulses, and
the number of falling edges of the pulses if the first binary error signal is determined by the number of rising edges of the pulses.

16. The system of claim 15, wherein the first and second binary error signals are transmitted to an OR gate and the output of the OR gate is a final binary error signal.

17. A method for peak detection in high-speed wireline communication systems, the method comprising:
receiving an input signal at a reference generator and an error amplifier;
generating a reference signal from a part of the input signal;
comparing the input signal and the reference signal to generate a preliminary error signal;
generating one or more full swing pulse signals from the preliminary error signal;
counting the one or more full swing pulse signals during an operational clock cycle of the pulse counter to create a pulse count; and
creating a binary error signal based on the pulse count.

18. The method of claim 17, wherein generating the reference signal from the part of the input signal comprises generating the reference signal from a common mode voltage of the input signal.

19. The method of claim 18, wherein comparing the input signal and the reference signal comprises determining whether an eye height of the input signal exceeds the reference signal.

20. The method of claim 19, further comprising:
synchronizing the binary error signal with an error correction system; and
resetting the binary error signal and the count of the number of pulses.

* * * * *